United States Patent [19]
Focarile

[11] 3,732,379
[45] May 8, 1973

[54] DISTRIBUTION BOARD

[75] Inventor: Joseph Patrick Focarile, Tennent, N.J.

[73] Assignee: Bell Telephone Laboratories Incorporated, Murray Hill, N.J.

[22] Filed: Mar. 23, 1971

[21] Appl. No.: 127,139

[52] U.S. Cl. ..........................179/91, 29/629, 339/17
[51] Int. Cl. ..................................................H04q 1/14
[58] Field of Search ..........................179/91 R, 91 A; 317/112, 100 B, 101 C, 101 CM, 101 D; 339/182, 252, 18 C; 200/61.71, 61.82; 29/624, 625, 628, 629, 630

[56] References Cited

UNITED STATES PATENTS

| | | | |
|---|---|---|---|
| 3,193,731 | 7/1965 | Gerlach et al. | 179/91 R |
| 3,281,751 | 10/1966 | Blair | 29/629 |
| 3,225,322 | 12/1965 | Reel | 317/112 |
| 3,509,270 | 4/1970 | Dube et al. | 29/625 |
| 3,616,532 | 11/1971 | Beck | 29/625 |

*Primary Examiner*—Kathleen H. Claffy
*Assistant Examiner*—Kenneth D. Baugh
*Attorney*—James Warren Falk and R. J. Guenther

[57] ABSTRACT

A main distributing frame for a telephone central office is disclosed in which quasi-permanently wired cross-connections may be automatically effected or removed. Connections are made by inserting a coiled, spring-like conductor into a recess equipped with the terminals between which a connection is to be completed. After being inserted to the proper depth, the conductor is allowed to partially unwind thereby allowing it to make a wiping engagement with the terminals in the recess. Connections are taken down by grasping one end of the coiled conductor and pulling it out of the recess in such a manner that it tends to unwind as pulled. Advantageously both the insertion and removal of the coiled conductors may be made by automatically controlled means. Removed conductors may be discarded.

5 Claims, 4 Drawing Figures

INVENTOR
J. P. FOCARILE
BY Howard R Popper
ATTORNEY

DISTRIBUTION BOARD

FIELD OF THE INVENTION

This invention relates to main distributing frame networks in switching systems.

DESCRIPTION OF THE PRIOR ART

The need to provide flexibility of connections between outside cable plant and wire center equipment in telephone offices was recognized with the advent of the telephone central office. Thus, a main distributing frame evolved, as disclosed in U. S. Pat. No. 816,847 issued Apr. 3, 1906 to F. B. Cook, which provided termination for outside plant cable pairs on a fixed basis to a terminal strip on one side of the main distributing frame with similar terminations for inside plant conductors on the other side of the frame.

Through the intervening years from the advent of the archetypical main distributing frame substantial improvements in the technology of automatic switching systems have occurred, but the basic main distributing frame has remained the same.

Basically, a main distributing frame provides a means whereby outside plant cable may be cross-connected to a selected central office circuit by placing a cross-connection wire pair between the appropriate terminal strip appearances on either side of the main distributing frame. The terminal strip terminals also provide a convenient point for maintenance test access.

While the main frame functions satisfactorily so long as there is capacity for the addition of new connections, there is also a continuing need to change and rearrange existing cross-connections. In many cases existing main distributing frames have been completely filled with cross-connection wire pairs making it almost impossible to remove an obsolete cross-connection before placing a new cross-connection. Thus some main distributing frames have become so congested with active and dead cross-connection wire pairs that new cross-connections cannot be made, and the particular main distributing frames have had to be abandoned and replaced by new main distributing frames. The installation of new frames requires massive replacement and retermination of cables from outside plant and central office circuits along with replacement of the necessary cross-connections. These extensive changes are very costly.

The problems of conventional main distributing frames have created a need for a new concept in providing the main distributing frame function. One approach to the problem is disclosed in U. S. Pat. No. 3,562,435 issued Feb. 9, 1971 to A. E. Joel, Jr. In the Joel patent a switching network is employed to perform the main distributing frame function. This specialized switching system has control circuitry including a memory and is responsive to signals from a teletypewriter input to selectively interconnect outside plant conductors with inside plant conductors. Because of the relatively long time that connections will normally remain established in a distributing frame, and because of the length of time that may be expected to elapse before a particular crosspoint will be operated, certain crosspoint contact problems may be encountered in that system which were not prevalent in the old hand-wired main frame. Of course, sealed contact switches might be employed to alleviate some of these conditions, but such switches are relatively more costly on a per contact basis.

It is accordingly an object of my invention to provide a new main distributing frame wherein cross-connections can be placed or removed with great facility.

It is another object of my invention to provide a new main distributing frame on which cross-connections may be made manually or automatically.

It is a further object of my invention to provide a new main distributing frame which can readily be adapted for use in an automatic main distributing frame switching system.

SUMMARY OF THE INVENTION

The above and other objects are attained in an illustrative embodiment of my invention in which cross-connections are made on a main distributing frame having a plurality of distribution boards thereon. Each distribution board comprises two flat insulating boards having a multiplicity of apertures arranged in rows and columns; the apertures of one board are in registration with the apertures of the second board, and each aperture contains an electrically conductive eyelet terminal. On one board all the eyelet terminals in each row of apertures are electrically common, and on the other board all the eyelets in each column of apertures are electrically common. Typically the row of eyelet terminals on one board will be associated with one external circuit path, such as outside plant cable, and the column of eyelets of the other board will be associated with another external circuit path such as a central office line circuit. To effect an interconnection between the two circuit paths a tightly coiled conductive spring having a coiled diameter less than and a free diameter greater than the inside diameter of the eyelet apertures is inserted into the aperture common to the aforementioned row and column eyelet terminals. The conductive spring is then allowed to partially unwind bringing it into wiping contact with the conductive surfaces of the eyelets and removing any dust or metallic oxide film therefrom.

The placement and removal of conductive spring cross-connections on a distributing frame may be accomplished automatically with apparatus that cuts off a given length of wire from a spool, tightly winds a spring, inserts the same into a desired aperture and releases the spring to contact the conductive eyelets therein. Similarly, connections may be automatically taken down by apparatus which is positioned to the desired aperture and which seizes the last coil of the spring to be removed and pulls it from the aperture. Advantageously, the connection between the two conductive paths may be removed by pulling the spring from the aperture in such a manner as to allow it to unravel as it is being pulled.

In accordance with an aspect of my invention a main distributing frame includes electrically conductive eyelet terminals in one insulating board of a distribution board insulated from the electrically conductive eyelet terminals in a second insulating board of a distribution board, the mating eyelets being electrically connected together by a conductive spring inserted into the eyelets.

It is another aspect of my invention that the diameter of the conductive spring released within and contacting the eyelet terminals is less than the free diameter of the spring; this creates spring contact pressure between the eyelet terminals and the conductive spring.

It is another feature of my invention to effect a connection in a main distributing frame by an arrangement which employs an expandible spring conductor that provides a contact-cleaning operation as it is installed.

It is yet another feature of my invention that all main distributing frame cross-connections may be effected by the use of a single length connector in the form of an automatically insertable coiled spring.

It is still another feature of my invention that a cross-connection may be taken down by removing a single coiled-spring connector in such manner that the spring unravels as it is removed.

Accordingly, my invention provides a main distributing frame which contains quasi-permanently wired cross-connections that are amenable to automatic insertion and removal.

DESCRIPTION OF THE DRAWING

The above and other objects and features of my invention will become more apparent from the following detailed description and the accompanying drawing in which.

DETAILED DESCRIPTION

Figure 1:
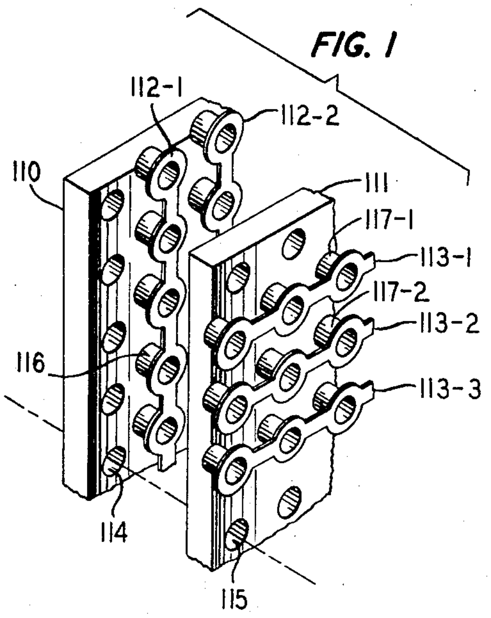
FIG. 1 is an exploded view showing the construction of my distributing frame terminal boards.

In FIG. 1 are shown the two insulating boards 110 and 111 which are used to make up a distributing board. Boards 110 and 111 may advantageously be glass-epoxy boards of the type commonly used for printed circuit boards. Each of boards 110 and 111 is perforated by a respective plurality of apertures 114, 115 arranged in rows and columns. Each of the apertures 114 in board 110 is in coaxial registration with a corresponding aperture 115 in board 111. Board 110 includes a plurality of conductor and eyelet terminal strips 112 arranged in columns 112–1, 112–2, and board 111 includes a plurality of conductor and eyelet strips 113 arranged in rows 113–1, 113–2, 113–3. Advantageously strips 112 and 113 may be fabricated of tin-plated copper. Conductor and eyelet strips 112, 113 include a plurality of eyelet shanks 116, 117–1, 117–2 respectively, each of which, advantageously, may be made so that it is slightly larger in diameter than the diameter of the apertures 114, 115 in boards 110 and 111. Accordingly the strips may be pressed into the respective apertures on boards 110 and 111 so that the eyelet shanks will be securely retained in their respective boards. Advantageously, the center-to-center distances between all apertures in both the rows and columns is 0.20 inch and the inside diameter of the eyelet shanks 116, 117–1, 117–2 is 0.090 inch.

Figure 2:
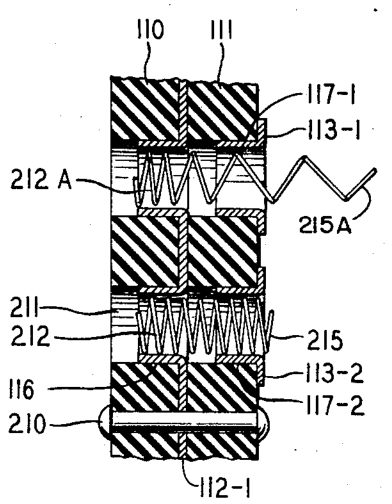
FIG. 2 is a cross-sectional side view of the distributing frame terminal boards showing a conductive spring connector in place in one aperture and another conductive spring connector in the process of being removed from another aperture.

Referring now to FIG. 2, the assembled distribution board is shown in cross-section. Boards 110 and 111 are fastened together with rivets 210. The length of the eyelet shanks 116 and 117–1, 117–2 on strips 112–1 and 113–1, 113–2 are each less than the thickness of their respective one of boards 110 and 111. Accordingly, strips 113–1, 113–2 on board 111 are insulated from strips 112–1 on board 110.

When it is desired to interconnect two external circuits, one associated with a row strip such as strip 113–2 and the other associated with a column strip such as strip 112–1, a spring connector 212 is inserted into the aperture 211 common to the two strips, and then the connector is allowed to expand as shown in the lower portion of FIG. 2. Spring connector 212 may advantageously be made of 0.016 inch diameter phosphor bronze wire and have an unstressed outside diameter of 0.100 inch. As spring connector 212 expands, it performs a rotary wiping action on the inside surface of the eyelet shanks 117–2 and 116 to remove dust and metallic oxides therefrom. Advantageously, the last coil 215 of an inserted spring 212 may be allowed to protrude slightly from the front of board 111 to facilitate its subsequent removal, as described hereinafter.

Figure 3:
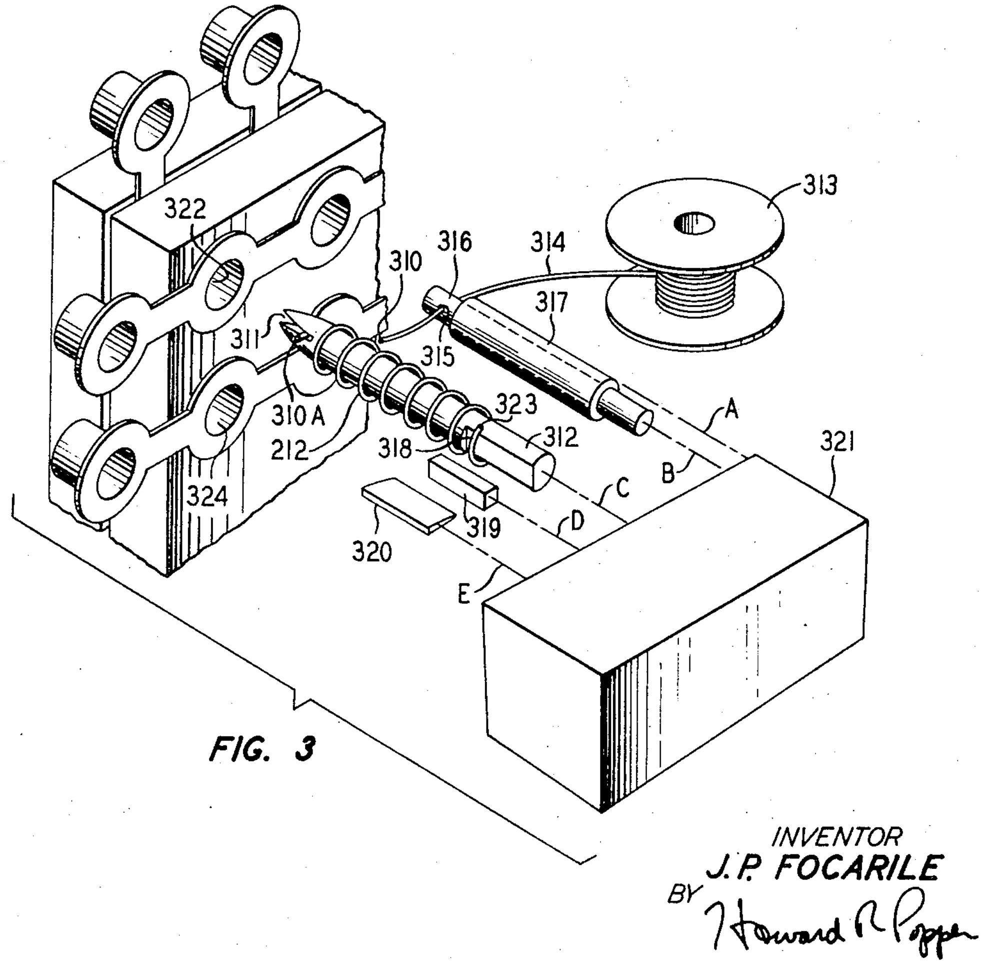
FIG. 3 is a perspective view showing a spring connector in the process of being inserted into a distributing frame aperture by means of an automatic insertion tool.

Sprint connector 212 may be inserted into aperture 211 by means of the apparatus shown in FIG. 3. The end 310 of phosphor bronze wire 314 on spool 313 is initially passed through hole 315 in wire guide 316 leaving a short segment of wire 314 protruding from hole 315. Thereafter, actuator 321 energizes linkage A to move sleeve 317 forward toward hole 315. Sleeve 317 is resiliently driven by linkage A with just sufficient pressure to bind wire 314 within hole 315. Now actuator 321 energizes linkages A and B to place end 310 of wire 314 in notch 311 of mandrel 312 such that end 310A does not protrude beyond notch 311. Sleeve 317 is thereafter withdrawn so that wire 314 may move freely through hole 315. At this time linkage C is energized by actuator 321 to rotate mandrel 312 counterclockwise. Mandrel 312 is rotated by linkage C with just sufficient pressure to avoid pulling end 310A of wire 314 from notch 311 but to snugly wind wire 314 into a spring 212. As mandrel 312 is being rotated, winding spring 212 thereon, actuator 321 energizes linkages A and B to move wire guide 316 and sleeve 317 gradually backwards towards actuator 321. In this manner the coils of spring 212 are evenly spaced on mandrel 312. When the last coil 318 of spring 212 is wound on mandrel 312, linkages A, B and C are deenergized and linkage A is reenergized by actuator 321 to bind wire 314 within hole 315 as priorly discussed. This keeps spring 212 firmly wound upon mandrel 312.

To cut spring 212 on mandrel 312 from wire 314, actuator 321 first energizes linkage D to move block 319 against mandrel 312 to firmly bind final winding 318 of spring 212. Thereafter actuator 321 momentarily energizes linkage E to move cutter 320 against mandrel 312 next to block 319 to cut wire 314 at end 323. Spring 212 is now ready to be inserted into aperture 322.

Figure 4:
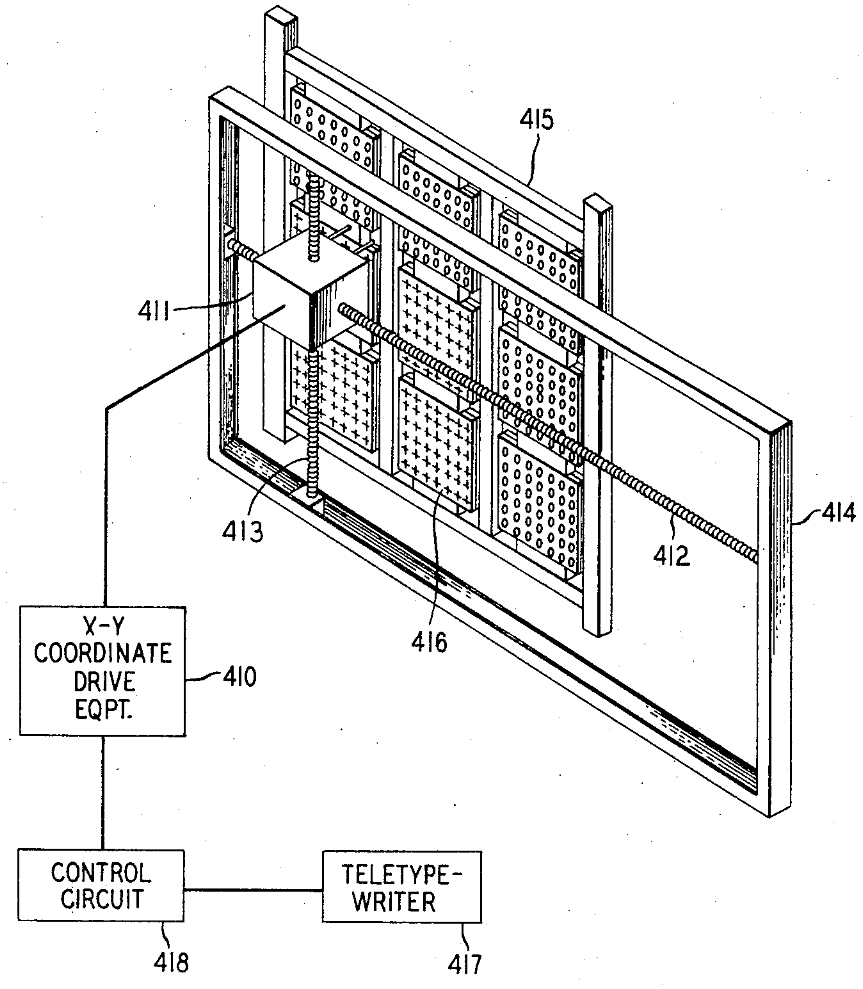
FIG. 4 illustrates a computer-driven automated mechanism for positioning the automatic tool of FIG. 3 to any desired aperture in the distributing frame.

Actuator 321 energizes linkages C and D to move mandrel 312 and block 319 forward toward aperture 322. When mandrel 312 with spring 212 thereon has passed into aperture 322 till block 319 is immediately adjacent to aperture 322, actuator 321 de-energizes linkages C and D to stop the forward travel of mandrel 312 and block 319. Actuator 321 thereafter energizes linkage D to move block 319 away from mandrel 312, thereby releasing spring 212. After spring 212 has expanded into contact with the eyelet terminals within aperture 322, actuator 321 momentarily energizes linkages C and D to move mandrel 312 and block 319 backwards out of and away from aperture 322. The apparatus for moving spring winding and inserting elements 311 through 321 into alignment with another aperture 324 is discussed hereinafter and is shown in FIG. 4.

Removal of a spring, such as connector spring 212A of FIG. 2, may readily be accomplished by a tool driven by actuator 321, the tool merely seizing the end coil 215A and being retracted or pulled back by the actuator 321.

The aforementioned A. E. Joel, Jr. patent discloses equipment for controlling a switching system that may be used in place of a conventional iron frame and terminal strip type main distributing frame to establish cross-connections between outside plant conductors and inside plant conductors. My invention is particularly concerned with apparatus in the main distributing frame switching network, as described in the Joel patent. In lieu of the switching network shown in Joel, my invention may be used as shown in the simplest form in FIG. 4. A distributing frame 415 having a plurality of modular distributing boards 416 utilizing my invention mounted thereon is provided and automated equipment 410, 411 is used, as is described hereinafter, to place and remove conductive spring cross-connections in distributing frame 415. Equipment 411 is the same as shown in FIG. 3, but including a simple mechanism to seize the one spring coil that protrudes from an aperture to remove the spring. The cited Joel patent may be consulted for a more complete understanding of the construction and operation of the teletypewriter 417 and input control circuit 418 in generating signals by which the switching network is controlled. These control signals are used to drive an X–Y coordinate drive equipment 410 such as disclosed in: E. M. Graffe, S. Romo, and D. E. Woolridge, Handbook of Automation Computation and Control, pp. 20–63 to 20–66 (Vol. 2, 1959). In the X–Y coordinate drive equipment 410, the digital switching network control signals are applied to digital-to-analog converters (not shown), the outputs of which are processed to drive two-phase motors (not shown). The first motor (not shown) provides X-axis drive to move spring insertion and removal equipment 411 in framework 414 horizontally along threaded rod 412. The second motor (not shown) provides 4-axis drive to move equipment 411 vertically along threaded rod 413. In response to an input from teletypewriter 417, the two motors (not shown) move equipment 411 in frame 414 to a particular aperture in which a conductive spring cross-connection is to be placed or removed.

Any number of distributing frames 415 or portions thereof may be connected together in stages capable of providing a permutation of outputs with respect to inputs. Thus, a predetermined input appearance may be selectively connected through to a predetermined output appearance by any one of a number of network paths.

It is to be understood that the above-described arrangement is merely illustrative of the numerous and varied other arrangements which may constitute applications of the principles of my invention. Such other arrangements may readily be devised by those skilled in the art without departing from the scope of my invention. Thus, for example, the conductor and eyelet strips may be inserted into either side of a single insulating board if, because of the thickness of the board and the length of the eyelet shanks, the eyelets inserted from either side of the single board do not contact each other. Or, for example, small cross-connection terminal strips utilizing my invention may be built with a manual tool utilizing the same principle shown in FIG. 3 used for winding and inserting springs and with needle-nose pliers used for removing springs.

What is claimed is:

1. A terminal strip arrangement for a distributing board including a first and a second insulating board adjacent to each other, each of said boards having a plurality of apertures through said boards arranged in rows and columns, with the axis of each of the apertures through said first board being in coaxial registration with the axis of a respective one of the apertures through said second board, conductive eyelet terminals inserted in each of said apertures with the eyelet terminals in each row of apertures through said first board being electrically connected and the eyelet terminals in each column of apertures through said second board being electrically connected, and a tightly coiled conductive spring inserted into a first aperture through said first board and into a coaxial second aperture through said second board and released to expand and contact said eyelet terminals in said first and said second apertures to thereby electrically connect the respective row and column of apertures associated therewith, wherein the improvement comprises strips of conductive material on each of which are fabricated a first plurality of said eyelet terminals with the eyelet shanks protruding from said strips, each of said strips forming said electrical connection of said eyelet terminals fabricated thereon, the spacing of said shanks being equal to the distance between any two apertures in the rows and columns of apertures through said boards, the eyelet shanks of ones of said strips being inserted into rows of apertures through said first board and the eyelet shanks of others of said strips being inserted into columns of apertures through said second board, said eyelet shanks being of a length less than the thickness of either of said boards so that said shanks do not extend through said boards when inserted into said apertures therethrough.

2. The invention in accordance with claim 1 wherein the outside dimension of said eyelet shanks adapts said shanks to be press fitted into said apertures to be retained therein.

3. A distributing board arrangement for selectively making electrical connections between outside plant and wire center equipment comprising a first and second nonconductive distributing board each having a plurality of apertures therethrough, said apertures being uniformly displaced along parallel and equidistant horizontal and vertical axes, a plurality of conductive eyelet strips, each strip comprising alternate sections of flat conductive material and downwardly extending eyelet shanks each having a depth dimension less than the thickness dimension of either said first or said second board, each of said strips being adapted for press-fit insertion of associated ones of said eyelet shanks into an adjacent series of said apertures situated along one of said horizontal or vertical axes, thereby defining a series of electrically conductive common apertures, and means for assembling said first and second board into which said strips have been inserted so as to bring predetermined ones of said conductive common apertures in each of said boards into coaxial alignment whereby a conductive material may be inserted through a coaxial pair of said conductive common apertures to electrically unite said last-mentioned apertures.

4. A main distributing frame for a telephone switching office comprising insulating board means having apertures therethrough arranged in rows and columns, first conductive strip means positioned directly adjacent to one surface of said board means along each of said columns, each of said first strip means including a plurality of first conductive eyelets extending into but not through said apertures, second conductive strip means positioned directly adjacent to the other surface of said board means along each of said rows, each of said second conductive means including a plurality of second conductive eyelets at each of said apertures, said first and said second conductive eyelets being electrically separated from each other, and conductive connector springs inserted in at least certain of said apertures and electrically connecting the first and second eyelets at said certain apertures, said spring normally having a larger diameter than the internal diameter of said apertures.

5. A main distributing frame in accordance with claim 4 wherein said board means comprises a first board to said one surface of which said first strip means is affixed and further comprising a second board to one surface of which said second strip means is affixed, said second board being adjacent to said other surface of said first board and said second board having apertures therethrough aligned with the apertures of said first board and said second conductive eyelets extending into but not through said apertures of said second board.

* * * * *